United States Patent [19]

Dudley et al.

[11] Patent Number: 5,050,394
[45] Date of Patent: Sep. 24, 1991

[54] CONTROLLABLE VARIABLE SPEED HEAT PUMP FOR COMBINED WATER HEATING AND SPACE COOLING

[75] Inventors: Kevin F. Dudley, Cazenovia; Lowell E. Paige, Pennellville; Kevin B. Dunshee, Syracuse, all of N.Y.

[73] Assignee: Electric Power Research Institute, Inc., Palo Alto, Calif.

[21] Appl. No.: 585,386

[22] Filed: Sep. 20, 1990

[51] Int. Cl.$^5$ ............................................. F25B 40/04
[52] U.S. Cl. ....................................... 62/115; 62/183; 62/238.6
[58] Field of Search ................. 62/183, 184, 238.6, 62/506, 507, 115

[56] References Cited

U.S. PATENT DOCUMENTS

| | | | |
|---|---|---|---|
| 3,017,162 | 1/1962 | Haines et al. | 62/183 X |
| 3,357,199 | 12/1967 | Harnish | 62/183 X |
| 3,926,008 | 12/1975 | Webber | 62/238.6 X |
| 4,238,931 | 12/1980 | Campbell | 62/183 |
| 4,474,018 | 10/1984 | Teagan | 62/183 X |
| 4,680,941 | 7/1987 | Richardson et al. | 62/184 |
| 4,766,734 | 8/1988 | Dudley | 62/160 |
| 4,790,145 | 12/1988 | Thompson et al. | 62/212 |
| 4,856,578 | 8/1989 | McCahill | 165/29 |
| 4,893,476 | 1/1990 | Bos et al. | 62/79 |

Primary Examiner—William E. Tapolcai
Attorney, Agent, or Firm—Wall and Roehrig

[57] ABSTRACT

An integrated air conditioning and water heating system provides cooling of a comfort zone, as required, as well as water heating. A variable speed compressor delivers compressed refrigerant first to a water heat exchanger and then to an outdoor condenser coil. From there the refrigerant cycles through an indoor evaporator coil back to the compressor. When the demand for water heating is above a predetermined amount and the cooling load is below a predetermined cooling load threshold, a full condensing mode is selected in which most of the heat from the comfort zone is used for water heating. If the cooling demand is high or if the water heating demand is low, a desuperheating mode is selected in which most of the heat is transferred to the outdoor air. The outdoor coil temperature is monitored and if it is above a safe limit, the desuperheating mode is selected. In the full condensing mode the outdoor fan is held off. In the desuperheating mode, the outdoor fan is energized.

10 Claims, 2 Drawing Sheets

CONTROLLABLE VARIABLE SPEED HEAT PUMP FOR COMBINED WATER HEATING AND SPACE COOLING

BACKGROUND OF THE INVENTION

This invention is directed to commercial or residential heat pump systems that provide heating or cooling of a comfort zone, as required, and which can also provide water heating. The invention is more particularly directed towards an improved control arrangement for optimizing the heating of water when the system is in a combined water heating and air conditioning mode.

Integrated heat pumps are often employed to provide heating or cooling, as needed, to a residential or commercial comfort zone, i.e., the interior of a residence, office complex, hospital, indoor recreational facility, or the like. Integrated heat pumps can also be employed to heat water. A heat pump system for air conditioning, comfort zone heating, and water heating is described in U.S. Pat. No. 4,766,734. Systems of this type can have a number of modes of operation, such as air conditioning alone, space heating alone, water heating alone, air conditioning with water heating, and comfort zone heating with water heating. Additional modes, such as a defrost cycle can also be employed. For comfort zone heating and water heating, resistive elements can be employed as auxiliary heating elements for use at times when the heat pump alone cannot produce sufficient heating of the comfort zone or produce enough hot water in the water heater.

During times that indoor space cooling is called for when there is also demand for hot water, the system is operated in a combined air conditioning and water heating mode. The indoor comfort zone air serves as a heat source for water heating. Ideally, to the extend possible the system water heat exchanger should serve as the heat dump for the heat extracted from the indoor comfort zone, so as to make the most efficient use of heat transfer. However, the amount of heat that the water in the water heating exchanger can accept is limited by factors such as its temperature and the amount of heat available. If there is a large cooling load, or if the water temperature is too high, excess heat has to be shed at the outdoor coil. Also, if the water heat exchanger alone is used to cool and condense the compressed refrigerant before returning it to the indoor evaporator coil, unusually high refrigerant pressures may result, and produce high torque conditions and possible damage to the compressor. No combined heat pump and water heating system to date has included means to direct output heat selectively to the water heat exchanger or to the outdoor coil.

OBJECTS AND SUMMARY OF THE INVENTION

It is an object of the present invention to improve integrated heat pump systems, with a feature that is not provided in the prior art.

It is a further object of the present invention to provide a method of operating an integrated heat pump and hot water system that produces cooling and water heating at high efficiency and without a reduction of user comfort.

A still further object of the present invention is to provide an automatic technique for using heat from the indoor comfort zone to the maximum extent possible for heating water without risk of damage to the compressor.

In accordance with an aspect of this invention, these and other objects are attained in an integrated heat pump and hot water system that is capable of providing air conditioning or cooling to an environmental comfort zone. The heat pump and hot water system employs a variable speed compressor whose operating speed is substantially linearly related to the cooling load, i.e., to the difference between the thermostat setpoint temperature and the indoor temperature within the comfort zone.

The compressor delivers a refrigerant fluid under pressure to a water heat exchanger that heats water by transfer of heat from the compressed refrigerant fluid. From here the refrigerant fluid flows to an outdoor heat exchanger which, in an air conditioning mode, serves as a condenser. Any heat not used for water heating can be shed here to the outdoor air, and the amount of heat transfer at the outdoor heat exchanger depends on the rate of air flow over the outdoor coil. From the outdoor coil the refrigerant passes through an expansion valve to an indoor heat exchanger in which an indoor coil serves as an evaporator. The indoor coil picks up heat from the air in the indoor comfort zone and transfers it to the refrigerant fluid. The indoor heat evaporates the refrigerant, and the refrigerant vapor returns to a low pressure port on the compressor.

A thermostat which is located in the comfort zone provides a cooling load signal to a system controller which then controls the compressor speed. The thermostat compares the comfort zone temperature to a setpoint temperature, and produces the cooling load signal. The latter can represent a fraction of cooling capacity and be calculated in the thermostat by a proportional-integral algorithm of the type often used in digital controls. The controller also has inputs coupled respectively to a water temperature sensor to receive information representing the temperature of the water heated by the water heat exchanger, and to an outdoor coil temperature sensor to receive information representing the temperature of the outdoor coil.

When the heat pump system is in a combined air conditioning and water heating mode, i.e., when there are both a demand for hot water and a call for cooling in the comfort zone, the controller will, so fast as possible, transfer the comfort zone heat to the water in the water heat exchanger. That is, if the condition of water temperature, refrigerant pressure, and cooling demand permit, the system will assume a water heat exchanger full condensation mode in which most of the heat is transferred to the water for water heating, and only a minor amount of heat is transferred to the outdoor air. However, if cooling demand is high, or if the water temperature rises to a level where full condensation is not efficient, or if the refrigerant pressure reaches a safe pressure limit, the system will assume a desuperheating mode. In this mode only desuperheating of the hot compressed refrigerant occurs in the water heat exchanger, and condensation occurs in the outdoor heat exchanger. That is, in a desuperheating mode, some heat is still transferred to the water, but most of the heat from the comfort zone is transferred to the outdoor air passing over the outdoor coil.

The system controller establishes the full condensation mode by turning off the fan or blower in the outdoor heat exchanger and establishes the desuperheating mode by energizing the fan or the blower.

According to the present invention, the cooling load called for by the thermostat is compared with a first predetermined value, i.e., a desuperheating cooling load that is stored in the controller; the water temperature is compared with a second predetermined value, i.e., a desuperheating temperature that is stored in the controller, and the outdoor coil temperature is compared to a third predetermined value, i.e., a pressure limit temperature. The desuperheating load can be some percentage of maximum, i.e., 90% of maximum cooling load. The desuperheating temperature can be a temperature e.g. between about 110° F. and 130° F. above which the desuperheating mode is more efficient than the full condensation mode. The outdoor coil temperature is a function of the refrigerant pressure, and so pressure limit temperature corresponds to a maximum safe pressure which should not be exceeded so that the torque imposed on the compressor does not become too high. This temperature can be on the order, e.g., of 135° F.

If all three of these conditions are met, namely that the demanded cooling load is below the desuperheating cooling load, the water temperature is below the desuperheating water temperature, and the outside coil temperature is below the pressure limit temperature, the controller selects the water heat exchanger full condensation mode, and holds the outdoor fan or blower off. In all other situations, i.e., if the cooling load is above the desuperheating cooling load, or if the water temperature is above the desuperheating temperature, or if the outdoor coil temperature is above the pressure limit temperature, the controller selects the desuperheating mode and energizes the outdoor fan or blower.

In the combined air conditioning and water heating mode some of the heat is rejected to the water and some to the outdoor air. The distribution of heat is controlled by outdoor fan or blower operation. When the fan is off, then most of the heat is transferred to the water in the water heat exchanger, so there is quick recovery of water tank temperature; this is the full condensation water heating mode. In this mode, space cooling capacity made be reduced due to the higher condensing temperature. If the outdoor fan is on, then most of the heat is transferred to the outdoor air and a smaller amount is transferred to the water; this is the desuperheating water heating mode. Space cooling capacity is not affected in this mode and water heating is obtained gratis, as no additional compressor energy input is needed.

Selection of the water heating mode is based on the cooling load and the water heating load. If the cooling load is high then only the desuperheating mode is permitted. If cooling load is low, then the full condensing mode is available and is used when the water heating load is high. The desuperheating mode is used when the water heating load is low.

For installations with electric water heaters, a water heater relay is provided to control power to the resistive water heater elements. A proportional-integral control algorithm is used to decide when the resistive water heater elements should be energized. The air conditioning/heat pump provides most of the water heating at higher efficiencies. The resistive elements are energized only when the heat pump cannot keep up with the water heating load and user comfort would be affected.

In the full condensing mode the controller protects the system against excessively high condenser temperatures which could affect air conditioning reliability and performance. The outdoor fan is turned on if the outdoor coil temperature reaches a preset limit. Then the air blown over the outdoor coil reduces the condenser temperature and puts the system into the desuperheating mode.

The above and many other objects, features, and advantages of this invention will become apparent to those skilled in the art from the ensuing description of a preferred embodiment, which is to be read in conjunction with the accompanying Drawing.

DETAILED DESCRIPTION OF THE PREFERRED EMBODIMENT

Figure 1:
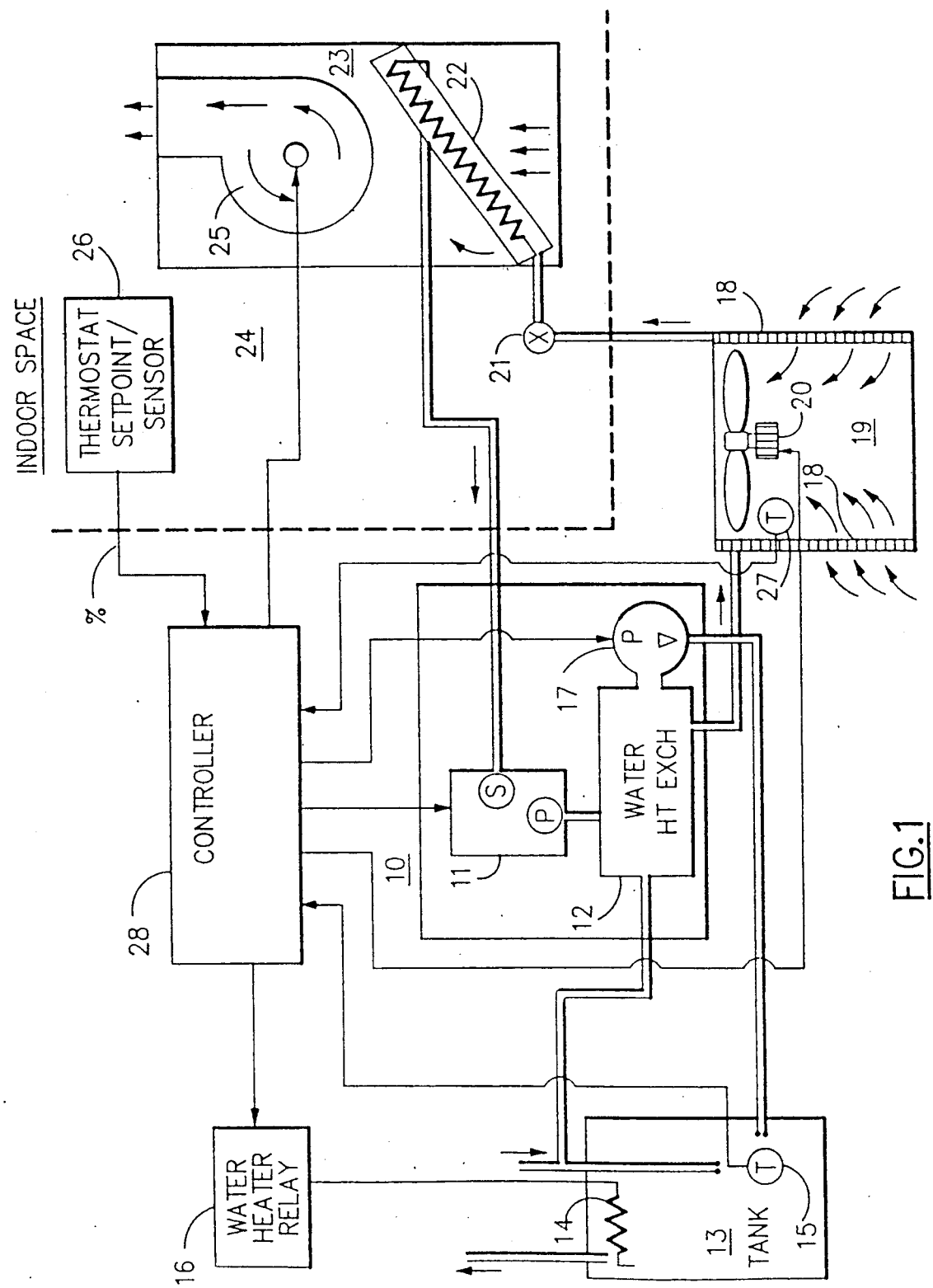
FIG. 1 is a schematic diagram of an integrated heat pump and hot water system which operates according to the principles of the present invention.

Referring now to the Drawing, and initially to FIG. 1, an integrated heat pump and hot water system 10 provides air conditioning and heating to an indoor comfort zone, and also provides hot water. In this system 10, a variable speed compressor 11 receives a low pressure refrigerant gas at a suction inlet S and discharges the refrigerant gas at high pressure from a discharge or pressure port P. The compressed refrigerant flows to a desuperheating heat exchanger 12 for heating water in a hot water tank 13. The tank has an auxiliary resistive heating element 14 and a temperature sensor 15. A water heater relay 16 selectively enables or disables the auxiliary heating element 14. A water pump 17 pumps water between the heat exchanger 12 and the tank 13.

From the heat exchanger 12, the compressed refrigerant gas flows through appropriate piping to an outdoor heat exchanger coil 18 that is disposed in an outdoor heat exchanger assembly 19 which also includes a fan or blower 20. From the outdoor coil 18 the heat exchanger fluid flows through a suitable expansion valve 21 to an indoor coil 22 contained within an indoor heat exchanger 23 located within an indoor comport zone 24. A variable speed fan 25 blows indoor air over the indoor coil 22.

A thermostat 26 is also disposed within the indoor comfort zone. In this case, the thermostat senses the ambient indoor temperature in the comfort zone and compares the ambient temperature with a setpoint temperature. The thermostat provides a proportional cooling load signal % which can favorably represent a percentage of maximum cooling capacity. The cooling load signal % is a variable that increases with increasing differences between ambient and setpoint temperatures.

An outdoor coil temperature sensor 27 is disposed on the outdoor coil 18 to register the temperature of the high pressure refrigerant that is condensing in the coil 18.

The indoor coil 22 serves as the evaporator for the refrigerant fluid. The refrigerant vapor, having picked up the heat from the indoor air, returns to the suction inlet S of the compressor 11.

A controller 28 is formed of a microprocessor having a memory storage capability and which is microprogrammable to control the variable speed compressor 11, the water pump 17, the variable speed indoor fan 25, the water heater relay 16, and the outdoor fan 20. The controller also has inputs connected to the water heater temperature sensor 15, the outdoor coil temperature sensor 27, and the thermostat 26.

Figure 2:
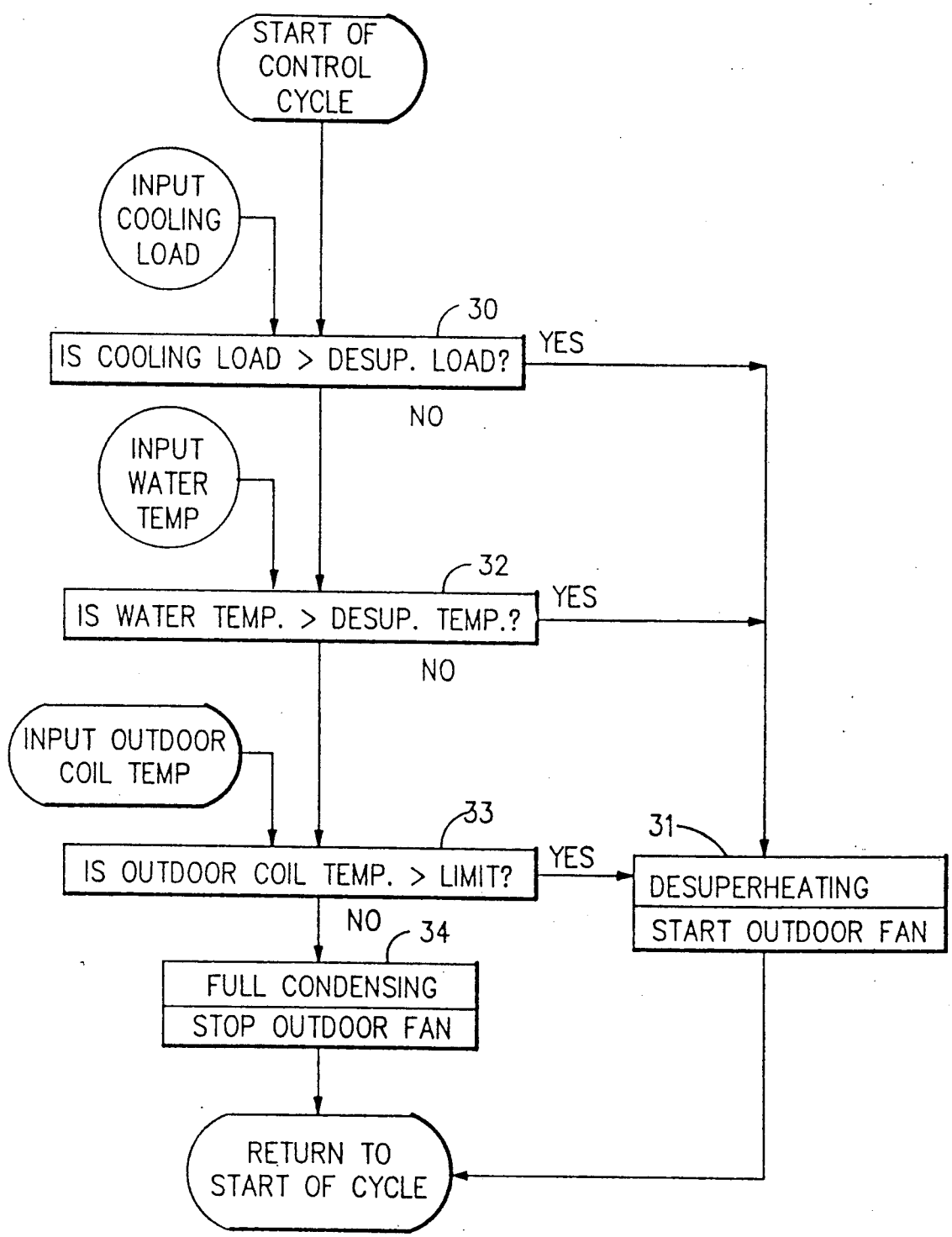
FIG. 2 is a flow chart logic diagram for explaining the principles of the present invention.

The controller 28 selects a water heating full condensation mode or a water heating desuperheating mode, and correspondingly holds the outdoor fan 20 off, or energizes it, according to a straightforward decision algorithm, as generally illustrated in FIG. 2.

At the commencement of a control cycle, the controller 28 scans the input from the thermostat 26 and compares the value of the cooling load signal % with a predetermined stored desuperheating load value, e.g. 90 percent. (block [30])

Then if the cooling load signal % is above the predetermined desuperheating load value, i.e., if the improved cooling load is greater than 90 percent of capacity, the controller selects the water heat desuperheating mode (block [31]). If the cooling load is less than the preset value, the controller 28 considers the water heating load (block [32]). The controller scans the output of the temperature sensor 15 and compares the value of the water temperature sensor output with a predetermined stored value that corresponds to a desuperheating temperature. If the sensor output value is above the stored value i.e., the water temperature is above the predetermined desuperheating temperature, this means that the water heating load is small and all of the water heating can be provided more efficiently by the desuperheating mode, so the controller selects the desuperheating mode. If the water temperature is cooler than the desuperheating temperature, the controller considers the refrigerant pressure (block [32]).

The controller 28 is input with the temperature output signal from the temperature sensor 27. If this output signal has a value exceeding a predetermined stored limit value, i.e., if the outdoor coil temperature is hotter than a safe temperature limit, then the system refrigerant pressure is at a safe limit and needs to be reduced. In this condition the controller selects the desuperheating mode (block [31]). However, if the outdoor coil temperature is below the predetermined temperature limit, the controller selects the full condensing mode (block [34]).

After selection of the desuperheating or full condensing mode, the control cycle is repeated.

In the full condensing mode (block [34]) the controller 28 stops the outdoor fan 20 so that only a minor amount of heat is transferred to the outside air. In the desuperheating mode (block [31]) the outdoor fan is started so that outside air flows over the condenser coil 18 and the coil 18 sheds a majority of the output heat from the compressed refrigerant.

In other embodiments, the fan 20 could be controlled, not simply on and off, but with a fan speed that depends on the cooling load and water heating load, Also, the principles of this invention could be applied to single speed compressors as well as to variable speed compressors.

While this invention has been described in detail with reference to a preferred embodiment, it should be understood that the invention is not limited to that precise embodiment. Rather, many modifications and variations would present themselves to those skilled in the art without departing from the scope and spirit of this invention, as defined in the appended claims.

What is claimed is:

1. A heat pump system that is capable of providing cooling to an environmental comfort zone and also providing water heating, wherein said heat pump system includes a compressor that is controlled as a function of cooling load imposed on the system; a water heat exchanger receiving a compressed refrigerant from said compressor for heating water by transfer of heat from said compressed refrigerant fluid; an outdoor heat exchanger having an outdoor fan and an outdoor condenser coil receiving the compressed refrigerant from said water heat exchanger for transfer of heat to outdoor air from the refrigerant fluid; an indoor heat exchanger having an indoor evaporator coil receiving the refrigerant fluid from the outdoor coil for transfer of heat from air in said environmental comfort zone to the refrigerant fluid, the refrigerant fluid returning from the indoor coil to an intake of said compressor; thermostat means for establishing a setpoint temperature for said comfort zone, sensing the temperature in said comfort zone, and providing a cooling load signal indicative of a cooling load that is a function of said comfort zone temperature; sensor means providing a water temperature signal having a value representing the temperature of the water heated by said water heat exchanger; outdoor coil temperature sensor means providing an outdoor coil temperature signal having a value representing the temperature of said outdoor coil; and controller means having inputs coupled to said thermostat means, said water temperature sensor means, and said outdoor coil temperatures sensor means and outputs connected to said compressor and to said outdoor fan; the controller being operative to compare said cooling load signal with a preset cooling load value; to compare said water temperature signal with predetermined desuperheating temperature value; to compare said outdoor coil temperature signal with a predetermined pressure limit temperature value; to operate said system in a water heat exchanger full condensation mode when said cooling load signal is below said preset cooling load value, said water temperature signal is below said desuperheating temperature value, and said outdoor coil temperature signal is below said predetermined limit temperature value, but to operate the system in a water heat exchanger desuperheating mode under all other conditions of said cooling load signal, said water temperature signal, and said outdoor coil temperature signal; in said full condensation mode said controller holding said outdoor fan off; and in said desuperheating mode said controller energizing said outdoor fan.

2. The heat pump system of claim 1 wherein said cooling load signal is a proportional integral signal representing a percentage of heat pump system capacity.

3. The heat pump system of claim 2 wherein said cooling load signal is a function of the difference between said set point and said comfort zone temperature.

4. The heat pump system of claim 1 wherein said predetermined desuperheating temperature value corresponds to a water temperature on the order of 110 to 130 degrees F.

5. The heat pump system of claim 1 wherein said predetermined pressure limit temperature value corresponds to a temperature at which the refrigerant fluid in the system is at a maximum safe operating pressure.

6. The heat pump system of claim 1 wherein said compressor is a variable speed compressor whose operating speed is controlled by said controller as a function of the value of said cooling load signal.

7. A method of controlling a heat pump system capable of providing cooling to an environmental comfort zone and also providing water heating, wherein a compressor delivers a refrigerant fluid under pressure to a water heat exchanger that heats water therein by transfer of heat from the refrigerant fluid, which fluid flows to an outdoor heat exchanger having a condenser coil for transferring heat from the refrigerant fluid to outdoor air and a fan for moving the outdoor air over said condenser coil, the refrigerant fluid flowing therefrom to an indoor evaporator heat exchanger for cooling air in the comfort zone by transfer of heat to the refrigerant fluid which returns from the indoor heat exchanger to an intake of the compressor; the method comprising comparing a cooling load imposed on the compressor with a predetermined desuperheating cooling load; comparing the temperature of the water heated in said water heat exchanger with a predetermined desuperheating temperature; comparing the temperature of the condenser coil with a predetermined pressure limit temperature; selecting a system full condensation mode when said cooling load is below the predetermined desuperheating cooling load, the temperature of the water is below said desuperheating temperature, and the temperature of the condenser coil is below said pressure limit temperature, but selecting a system desuperheating mode otherwise; and holding said fan off when said full condensation mode is selected but energizing said fan when said desuperheating mode is selected.

8. The method of claim 7 wherein said cooling load is a function of ambient temperature in the comfort zone and of a preset setpoint temperature, wherein the cooling load increases with increase in the difference between said ambient and setpoint temperature.

9. The method of claim 7 wherein said predetermined desuperheating temperature is on the order of 110 to 130 degrees F.

10. The method of claim 7 wherein said pressure limit temperature corresponds to a temperature at which the refrigerant fluid in the system is at a maximum safe operating pressure.

* * * * *